(12) United States Patent
Hung et al.

(10) Patent No.: US 12,235,545 B2
(45) Date of Patent: Feb. 25, 2025

(54) ELECTRONIC DEVICE

(71) Applicant: Innolux Corporation, Miao-Li County (TW)

(72) Inventors: Luca Hung, Tainan (TW); Lynn Kuo, Hsinchu County (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 18/452,986

(22) Filed: Aug. 21, 2023

(65) Prior Publication Data
US 2023/0393435 A1 Dec. 7, 2023

Related U.S. Application Data

(63) Continuation of application No. 17/978,897, filed on Nov. 1, 2022, which is a continuation of application No. 17/235,845, filed on Apr. 20, 2021, now Pat. No. 11,513,398.

(51) Int. Cl.
*G02F 1/1339* (2006.01)
*G02F 1/1335* (2006.01)

(52) U.S. Cl.
CPC .... *G02F 1/13396* (2021.01); *G02F 1/133512* (2013.01)

(58) Field of Classification Search
CPC ........... G02F 1/13396; G02F 1/133512; G02F 1/136286
See application file for complete search history.

(56) References Cited

U.S. PATENT DOCUMENTS

| | | | |
|---|---|---|---|
| 2010/0201933 A1* | 8/2010 | Sonoda | G02F 1/133305 349/141 |
| 2011/0222014 A1* | 9/2011 | Kim | G02F 1/13394 349/155 |
| 2014/0118666 A1* | 5/2014 | Lee | G02F 1/13394 349/106 |
| 2022/0399377 A1* | 12/2022 | Zhao | G02F 1/136286 |

* cited by examiner

*Primary Examiner* — Angela M. Medich
(74) *Attorney, Agent, or Firm* — Patterson + Sheridan, LLP

(57) ABSTRACT

An electronic device is provided. The electronic device includes: a first substrate structure and a second substrate structure. The first substrate structure has first overlapping region, first two protruding regions, a second overlapping region, second two protruding regions, and third two protruding regions. One of the first overlapping region and the second overlapping region is located between the third two protruding regions. The second substrate structure is disposed opposite to the first substrate structure and includes a main spacer and a sub spacer. The main spacer overlaps the first overlapping region of the first substrate structure. The sub spacer overlaps the second overlapping region of the first substrate structure. The first overlapping region is located between the first two protruding regions, and the second overlapping region is located between the second two protruding regions.

6 Claims, 10 Drawing Sheets

ELECTRONIC DEVICE

CROSS REFERENCE TO RELATED APPLICATIONS

This application is a Continuation of pending U.S. patent application Ser. No. 17/978,897, filed Nov. 1, 2022 and entitled "ELECTRONIC DEVICE," which is a Continuation of pending U.S. patent application Ser. No. 17/235,845, filed Apr. 20, 2021 and entitled "DISPLAY PANEL AND ELECTRONIC DEVICE", the entirety of which are incorporated by reference herein.

BACKGROUND

Field of the Disclosure

The present disclosure relates to a display panel and an electronic device, and in particular to a display panel and a display device including a substrate with different heights for positioning the spacers.

Description of the Related Art

Display panels are commonly used in electronic devices (i.e. display devices). The substrates of existing display panels may shift due to stress, and the spacers between the substrates may misalign, which may damage the display panels. The stability of display panels still needs to be improved. Therefore, finding a way to solve the above problem has become an important issue.

BRIEF SUMMARY

Some embodiments of the disclosure provide an electronic device, including a first substrate structure and a second substrate structure. The first substrate structure has first overlapping region, first two protruding regions, a second overlapping region, second two protruding regions, and third two protruding regions. One of the first overlapping region and the second overlapping region is located between the third two protruding regions. The second substrate structure is disposed opposite to the first substrate structure and includes a main spacer and a sub spacer. The main spacer overlaps the first overlapping region of the first substrate structure. The sub spacer overlaps the second overlapping region of the first substrate structure. The first overlapping region is located between the first two protruding regions, and the second overlapping region is located between the second two protruding regions.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION

Figure 1:
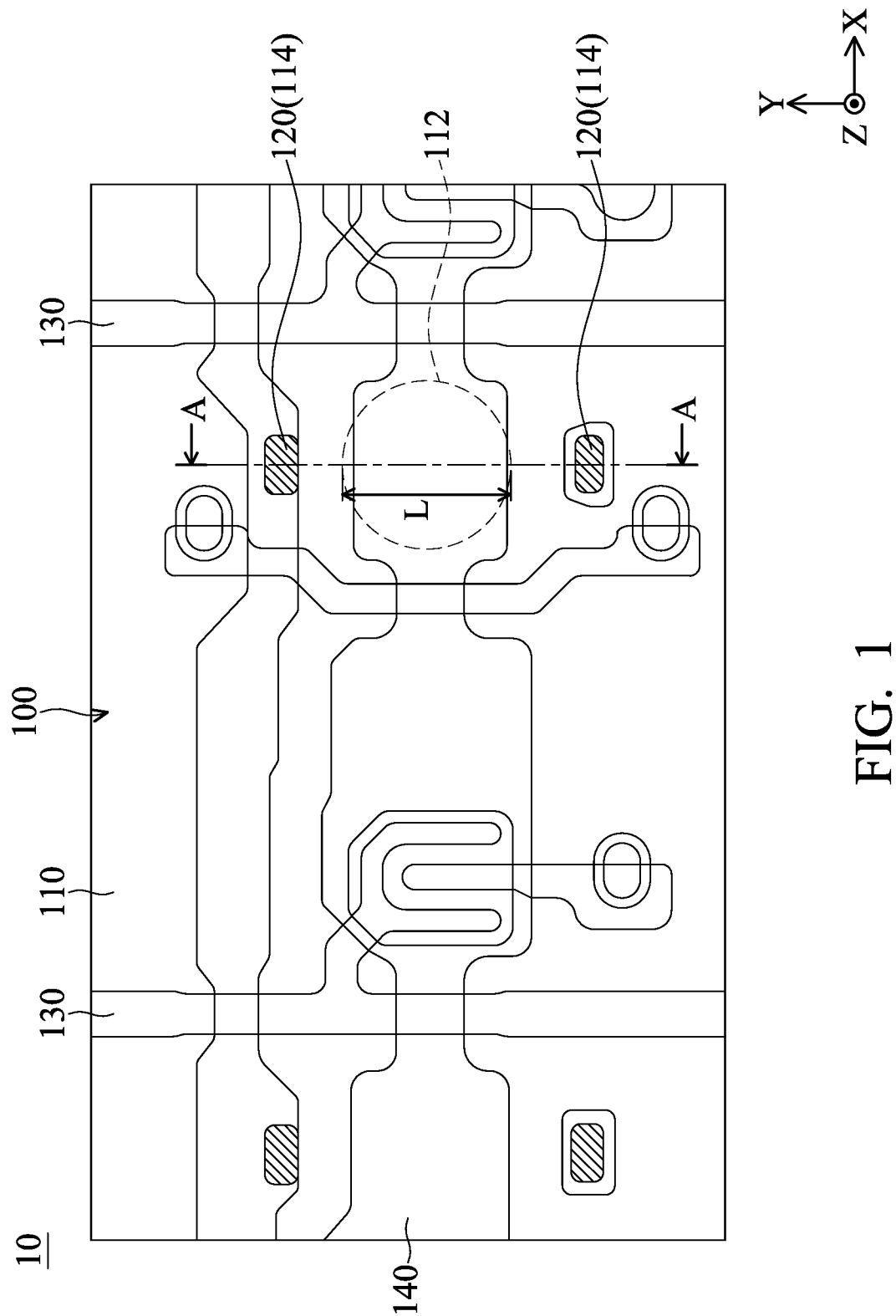
FIG. 1 is a top view illustrating a display panel in accordance with some embodiments of the present disclosure.

The present disclosure may be understood referring to the following description and the appended drawings. It is noted that for the sake of the comprehensibility and the simplicity of the drawings for the readers, only a portion of the light-emitting unit is illustrated in multiple figures in the present disclosure, and the specific component in the figures are not drawn to scale. In addition, the number and size of each component in the drawings merely serve as an example, but are not intended to limit the scope of the present disclosure. Furthermore, similar and/or corresponding numerals may be used in different embodiments for describing some embodiments simply and clearly, but not represent any relationship between different embodiment and/or structures discussed below.

Certain terms may be used throughout the present disclosure and the appended claims to refer to particular elements. Those skilled in the art will understand that electronic device manufacturers may refer to the same components by different names. The present specification is not intended to distinguish between components that have the same function but different names. In the following specification and claims, the words "including", "comprising", "having" and the like are open-ended words, so they should be interpreted as meaning "including but not limited to . . . ". Therefore, when terms "including", "comprising", and/or "having" are used in the description of the disclosure, the presence of corresponding features, regions, steps, operations and/or components is specified without excluding the presence of one or more other features, regions, steps, operations and/or components.

In addition, in this specification, relative expressions may be used. For example, "lower", "bottom", "higher" or "top" are used to describe the position of one element relative to another. It should be noted that if a device is flipped upside down, an element that is "lower" will become an element that is "higher".

When a corresponding component (i.e. a film layer or region) is referred to as "on another component", it may be directly on another component, or there may be other components in between. On the other hand, when a component is referred "directly on another component", there is no component between the former two. In addition, when a component is referred "on another component", the two components have an up-down relationship in the top view, and this component can be above or below the other component, and this up-down relationship depends on the orientation of the device.

The terms "about" or "substantially" are generally interpreted as within 20% of a given value or range, or as interpreted as within 10%, 5%, 3%, 2%, 1%, or 0.5% of a given value or range.

It should be understood that, although the terms "first", "second" etc. may be used herein to describe various elements, regions, layers and/or portions, and these elements, regions, layers, and/or portions should not be limited by these terms. These terms are only used to distinguish one element, component, region, layer, or portion. Thus, a first element, component, region, layer or portion discussed below could be termed a second element, component, region, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

In the present disclosure, the thickness, length, and width can be measured by using an optical microscope, and the thickness can be measured by the cross-sectional image in the electron microscope, but it is not limited thereto. In addition, a certain error may be present in a comparison with any two values or directions. If the first direction is perpendicular to the second direction, the angle between the first direction and the second direction may be between 85 degrees and 95 degrees. If the first direction is parallel to the second direction, the angle between the first direction and the second direction may be between 0 degrees and 5 degrees.

It should be noted that the technical solutions provided by different embodiments below may be interchangeable, combined or mixed to form another embodiment without departing from the spirit of the present disclosure.

Unless defined otherwise, all terms (including technical and scientific terms) used herein have the same meaning as commonly understood by one having ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

FIG. 1 is a top view illustrating a display panel 10 in accordance with some embodiments of the present disclosure. It should be understood that only some elements of the display panel 10 are illustrated in FIG. 1 for clarity. In accordance with some embodiments, additional features or elements may be optionally added to the display panel 10. In some embodiments, an electronic device may include the display panel 10. For example, the electronic device may include a display device, an antenna device, a sensing device, or a tiled device, but it is not limited thereto. The electronic device may be a bendable or flexible electronic device, but it is not limited thereto. The electronic device may include, for example, liquid crystal, light-emitting diode (LED), fluorescence, phosphor, other suitable display medium or combinations thereof, but not limited thereto. For instance, the LED may include inorganic LED, organic LED (OLED), mini LED, micro LED or quantum dot LED (QLED or QDLED), other suitable material or any combination thereof, but the present disclosure is not limited thereto. The antenna device may be, for example, a liquid-crystal antenna, but it is not limited thereto. The tiled device may be, for example, a display tiled device, or an antenna tiled device. It should be noted that the electronic device may be any combination thereof, but it is not limited thereto.

In some embodiments, the display panel 10 may include a first substrate structure 100, a second substrate structure 200 and a liquid crystal layer (not shown). The second substrate structure 200 may be opposite to the first substrate structure 100 and the liquid crystal layer may be disposed between the first substrate structure 100 and the second substrate structure 200. It is noted that in order to clearly illustrate the configuration of the first substrate structure 100, the second substrate structure 200 is not shown in FIG. 1 and will be discussed in following paragraphs. In some embodiments, the first substrate structure 100 may include a first base 110, a plurality of protrusion structures 120, a plurality of data lines 130 and a plurality of scan lines 140. The plurality of protrusion structures 120 may be disposed on the first base 110. One of the plurality of protrusion structures 120 may be disposed adjacent and opposite to another of the plurality of protrusion structures 120. The plurality of data lines 130 and the plurality of scan lines 140 may be disposed on the first base 110. The two adjacent protrusion structures 120 are arranged along an extending direction of the data lines 130. However, the present disclosure is not limited thereto. In some embodiments, the data lines 130 may include repeated segments, and each of the segments may be any shape (for example, wave-shaped). The extending direction of the data lines 130 may be defined as a direction parallel to the line that connects the corresponding point of the segments of the data lines 130. In some embodiments, the scan lines 140 may include repeated segments, and each of the segments may be any shape (for example, wave-shaped). The extending direction of the scan lines 140 may be defined as a direction parallel to the line that connects the corresponding point of the segments of the scan lines 140.

In some embodiments, the first base 110 may be flexible bases or non-flexible bases, but it is not limited thereto. For example, the materials of the first base 110 may include glass, sapphire, ceramics, plastics, or other suitable materials. The plastic material may be, for example, polyimine (PI), polyethylene terephthalate (PET), polycarbonate (PC), polyether oxime (PES), polybutylene terephthalate (PBT), polynaphthalene ethylene glycolate (PEN), polyarylate (PAR), other suitable materials, or a combination thereof, but it is not limited thereto.

In some embodiments, the X direction and the Y direction may be perpendicular to each other, and the Z direction may be perpendicular to the X direction and the Y direction, but it is not limited thereto. In some embodiments, the X direction may be substantially parallel to the extending direction of the scan line 140, the Y direction may be substantially parallel to the extending direction of the date line 130, and the Z direction may be substantially perpendicular to the top surface of the first base 110, but it is not limited thereto. In some embodiments, the X direction may be substantially parallel to the arrangement direction of two adjacent protrusion structures 120. In some embodiments, the Y direction may be substantially parallel to the arrangement direction of two adjacent protrusion structures 120.

Figure 2:
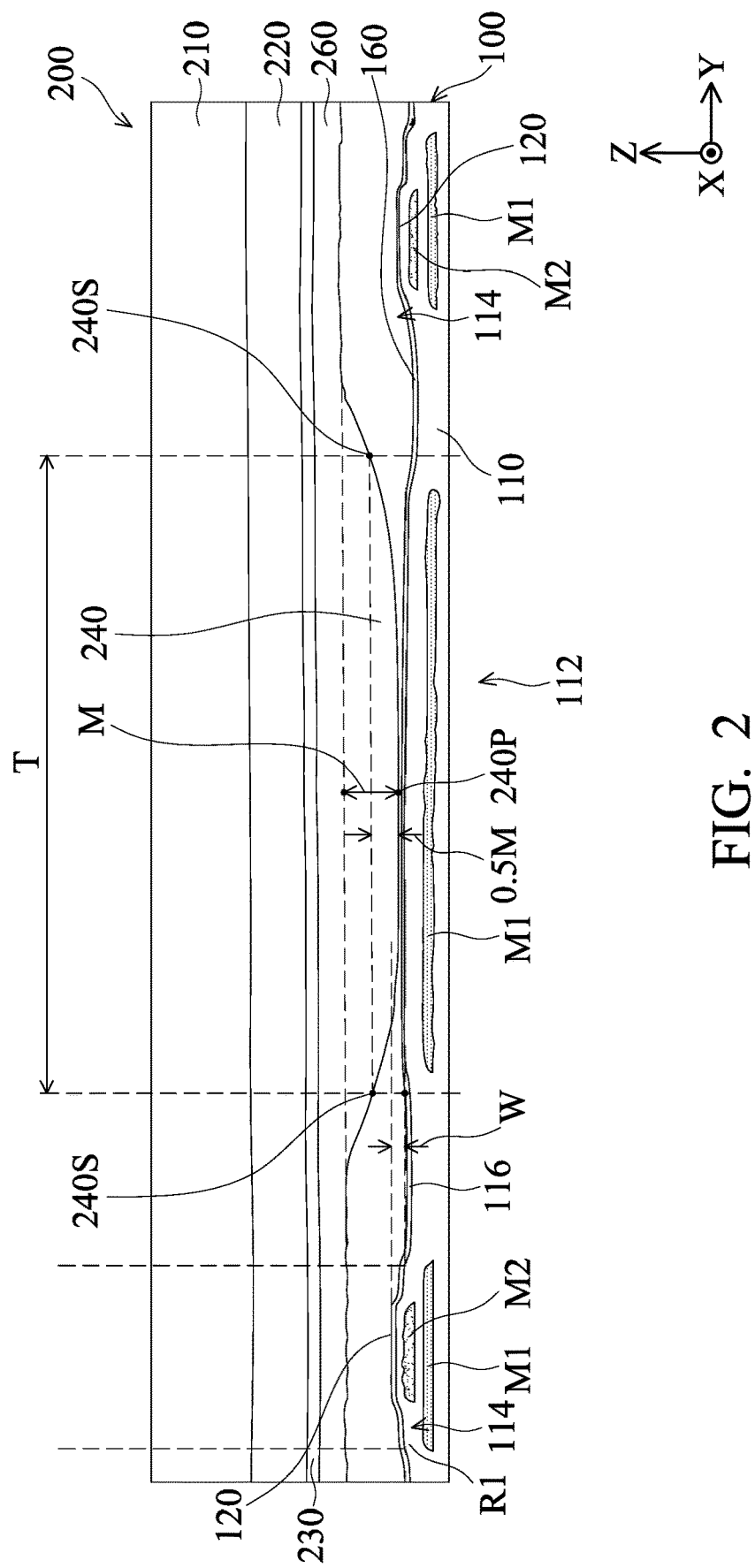
FIG. 2 is a cross-sectional view illustrating the display panel in accordance with some embodiments of the present disclosure.

FIG. 2 is a cross-sectional view illustrating the display panel 10 in accordance with some embodiments of the present disclosure. For example, the first substrate structure 100 shown in FIG. 2 is illustrated along the line A-A shown in FIG. 1. However, the present disclosure is not limited thereto. As shown in FIG. 2, the second substrate structure 200 may include a second base 210, a light shielding element 220, a color filter 230, an overcoat layer 260 and a main spacer 240. In some embodiments, the light shielding element 220, the color filter 230, the overcoat layer 260 and the main spacer 240 may be disposed on the second base 210, the light shielding element 220, the color filter 230, the overcoat layer 260, and the main spacer 240 may be stacked in order, and the main spacer 240 may extend toward the first substrate structure 100. In some embodiments, the second base 210 may be flexible bases or non-flexible bases, but it is not limited thereto. For example, the materials of the second base 210 may include glass, sapphire, ceramics, plastics, or other suitable materials. The plastic material may be, for example, polyimine (PI), polyethylene terephthalate (PET), polycarbonate (PC), polyether oxime (PES), polybutylene terephthalate (PBT), polynaphthalene ethylene glycolate (PEN), polyarylate (PAR), other suitable materials, or a combination thereof, but it is not limited thereto. In some embodiments, the material of the overcoat layer 260 may include an organic photoresist, for example, a thermosetting photoresist. In some embodiments, the material of the main spacer 240 may include an organic photoresist, for example, a patternable photoresist. Accordingly, the material of the overcoat layer may be different from the material of the main spacer 240, but the present disclosure is not limited thereto.

In addition, the first substrate structure 100 may include a plurality of conductive elements M1 and a plurality of conductive elements M2. In some embodiments, the plurality of conductive elements M1 and the plurality of conductive elements M2 may be configured to transmit electric signals or electrically connect to a ground voltage. The plurality of conductive elements M1 and the plurality of conductive elements M2 may be separated and insulated by a plurality of insulating elements R1. The protrusion structure 120 of the first substrate structure 100 is formed by stacking the conductive elements M1 and M2 and the insulating elements R1. In some embodiments, the protrusion structure 120 has a stepped profile or a gentle gradient in a cross-sectional view. Although the present embodiment is discussed above, it should be appreciated that the protrusion structure 120 may be formed by stacking any numbers of the conductive elements and the insulating elements.

In some embodiments, the conductive elements M1 and M2 may be omitted in the protrusion structure 120. In some embodiments, the first substrate structure 100 may include a conductive layer 150 (shown in FIG. 3) disposed between the conductive elements M2 and the base 110. For example, the material of the conductive layer 150 may include ITO, any other suitable material, or a combination thereof. In some embodiments, the conductive layer 150 may be omitted. In some embodiments, the first substrate structure 100 may include an alignment layer 160 for improving the performance of the display panel 10. The alignment layer 160 may be disposed on the protrusion structure 120.

In some embodiments, the main spacer 240 has a lowest point 240P, and the lowest point 240P is the closet point of the main spacer 240 to the first substrate structure 100. Thickness M may be defined as the thickness from the lowest point 240P to the upper surface (i.e. the interface of the overcoat layer 260 and the main spacer 240) of the main spacer 240. In some embodiments, the thickness M may be measured in the Z direction, which is substantially perpendicular to the upper surface of the main spacer 240, but the present disclosure is not limited thereto. Then, a horizontal line is illustrated at half of the thickness M and may intersect with the main spacer 240 at two points 240S in the cross-sectional view. That is to say, width T may be defined as the full width at half maximum (FWHM) of the main spacer 240. For example, the width T may be measured in the Y direction parallel to the upper surface of the main spacer 240. The first substrate structure 100 may have a region that is vertically projected from the spacer (such as main spacer 240) onto the first substrate structure 100, and the region may be defined as an overlapping region 112. As such, the overlapping region 112 may have a width that is substantially the same as the width T of the spacer (such as main spacer 240).

Furthermore, the first substrate structure 100 may have two protruding regions 114 disposed adjacent to the overlapping region 112, and the overlapping region 112 is disposed between the two protruding regions 114. To be more specific, the protruding regions 114 are defined as a region that is higher than the lowest point of the overlapping region 112. In other words, when a plane is defined from the lowest point of the overlapping region 112 and parallel to the bottom surface of the base 110, the protruding regions 114 are located higher than the above plane. In some embodiments, the protrusion structures 120 may be disposed in the protruding regions 114. In some embodiments, a minimum distance between the two protruding regions 114 is ranged from the width T of the main spacer 240 to three times the width T of the main spacer 240. In some embodiments, the protrusion structure 120 may be formed by stacking a plurality of conductive elements M1 and a plurality of insulating elements R1. The protrusion structure 120 may be disposed in the protruding region and the outline of the uppermost conductive element can be observed from the top view (shown in FIG. 1), the minimum distance between the two protruding regions 114 in Y direction may be defined as the minimum distance between the two outlines of the uppermost conductive element of protrusion structure 120, but the present disclosure is not limited thereto. Based on the above configuration, the main spacer 240 may be positioned between the two protruding regions 114, and the possibility that the main spacer 240 shifts may be reduced.

As defined above, the main spacer 240 may overlap the overlapping region 112 of the first substrate structure 100. The first height difference W may be defined as the difference between the height of the overlapping region 112 and the height of either of the two protruding regions 114 (such as the left one). The first height difference W is greater than zero. For example, the first height difference W may be defined as the difference between the minimum distance from the bottom surface of the base 110 to the top point of the protruding region 114 and the minimum distance from the bottom surface of the base 110 to the bottom point of the overlapping region 112. In others embodiments, the first height difference W may be defined as the difference between the minimum distance from the top surface of the base 110 to the top point of the protruding region 114 and the minimum distance from the top surface of the base 110 to the bottom point of the overlapping region 112. Furthermore, in some embodiments, the heights of the two protruding regions 114 adjacent to the overlapping region 112 may be different. To be more specific, the height of one of the two protruding regions 114 is less than the height of the other of the two protruding regions 114. However, the present disclosure is not limited thereto.

Figure 3:
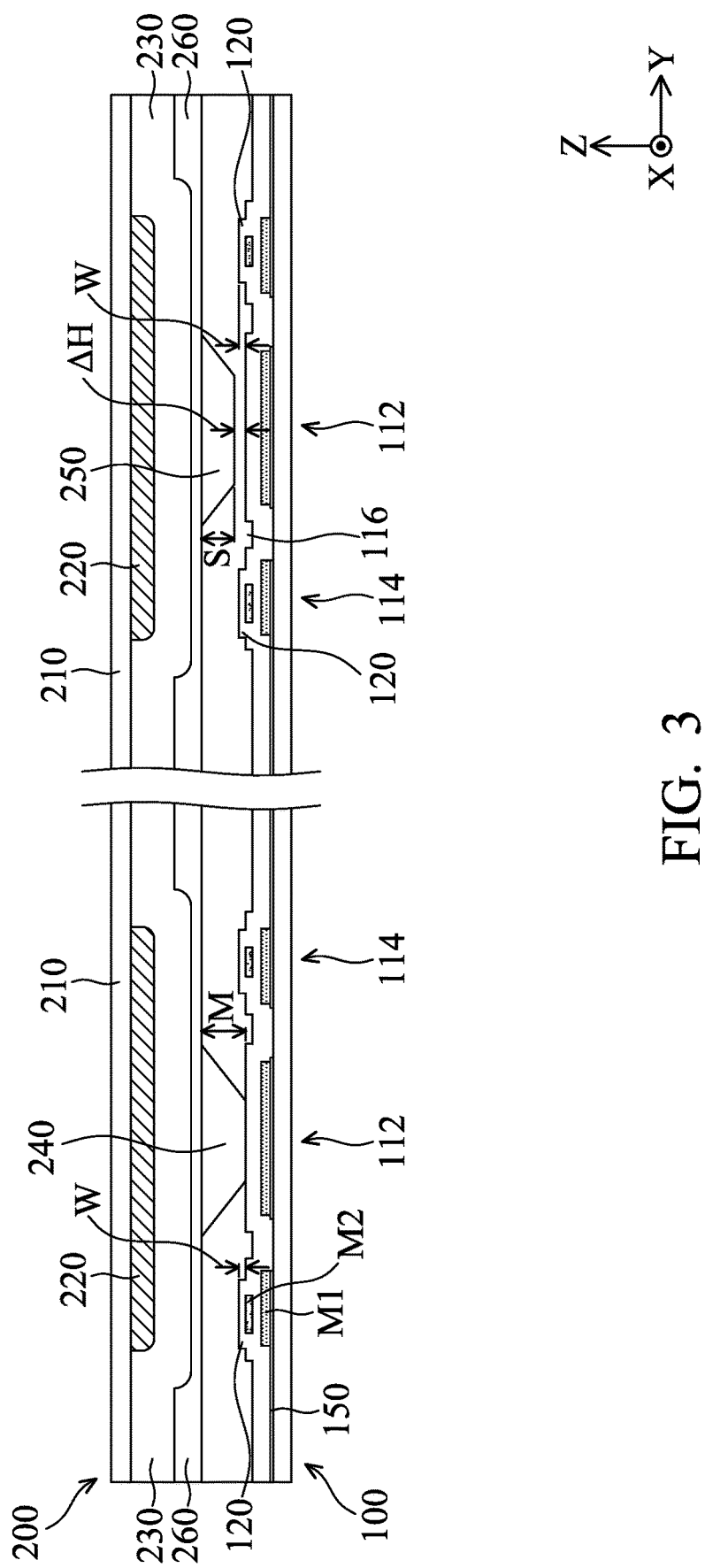
FIG. 3 is a cross-sectional view illustrating the display panel in accordance with some embodiments of the present disclosure.

FIG. 3 is a cross-sectional view illustrating the display panel 10 in accordance with some embodiments of the present disclosure. It is noted that FIG. 3 may be illustrated under vacuum environment or before the assembly of the first substrate structure 100 and the second substrate structure 200. As shown in FIG. 3, the second substrate structure 200 may further include a sub spacer 250. The sub spacer 250 may be disposed adjacent to the main spacer 240 and extend towards the first substrate structure 100. In some embodiments, the sub spacer 250 may overlap an overlapping region 112 of the first substrate structure 100, and the overlapping region 112 is disposed between two protruding regions 114.

In some embodiments, the sub spacer 250 may have a thickness S, and the thickness S may be measured in the Z direction. In some embodiments, the second height difference W between the overlapping region 112 and the protruding region 114 may be less than the thickness S of the sub spacer 250. Based on the above configuration, the sub spacer 250 may be configured to support the second substrate structure 200, or reducing the possibility that the first substrate structure 100 collides with the second substrate structure 200. As such, the possibility of damage of the display panel 10 may be reduced. In some embodiments, at least two sub spacers 250 may be located between two main spacers 240, but the present disclosure is not limited thereto.

In some embodiments, a thickness difference ΔH may be defined as the thickness difference between the main spacer 240 and the sub spacer 250. For example, the thickness difference ΔH may be measured in the Z direction. The thickness difference ΔH between the main spacer 240 and the sub spacer 250 may improve the distribution of the liquid-crystal layer after the assembly of the first substrate structure 100 and the second substrate structure 200. As such, the yield and/or the performance of the display panel may be improved. In some embodiments, the defect (such as a mura, or a bubble in the liquid-crystal layer) may be reduced.

In some embodiments, the heights of the two protruding regions 114 adjacent to the sub spacer 250 may be different. To be more specific, the height of one of the two protruding regions 114 is less than the height of the other of the two protruding regions 114. In some embodiments, a liquid-crystal layer (not shown) may be disposed between the first substrate structure 100 and the second substrate structure 200. That is, after assembling the first substrate structure 100 and the second substrate structure 200, the liquid-crystal layer may be disposed around the main spacer 240 and the sub spacer 250. In some embodiments, the liquid-crystal layer may include nematic liquid crystal, smectic liquid crystal, cholesteric liquid crystal, blue phase liquid crystal, or any other suitable liquid-crystal material, the present disclosure is not limited thereto.

Figure 4:
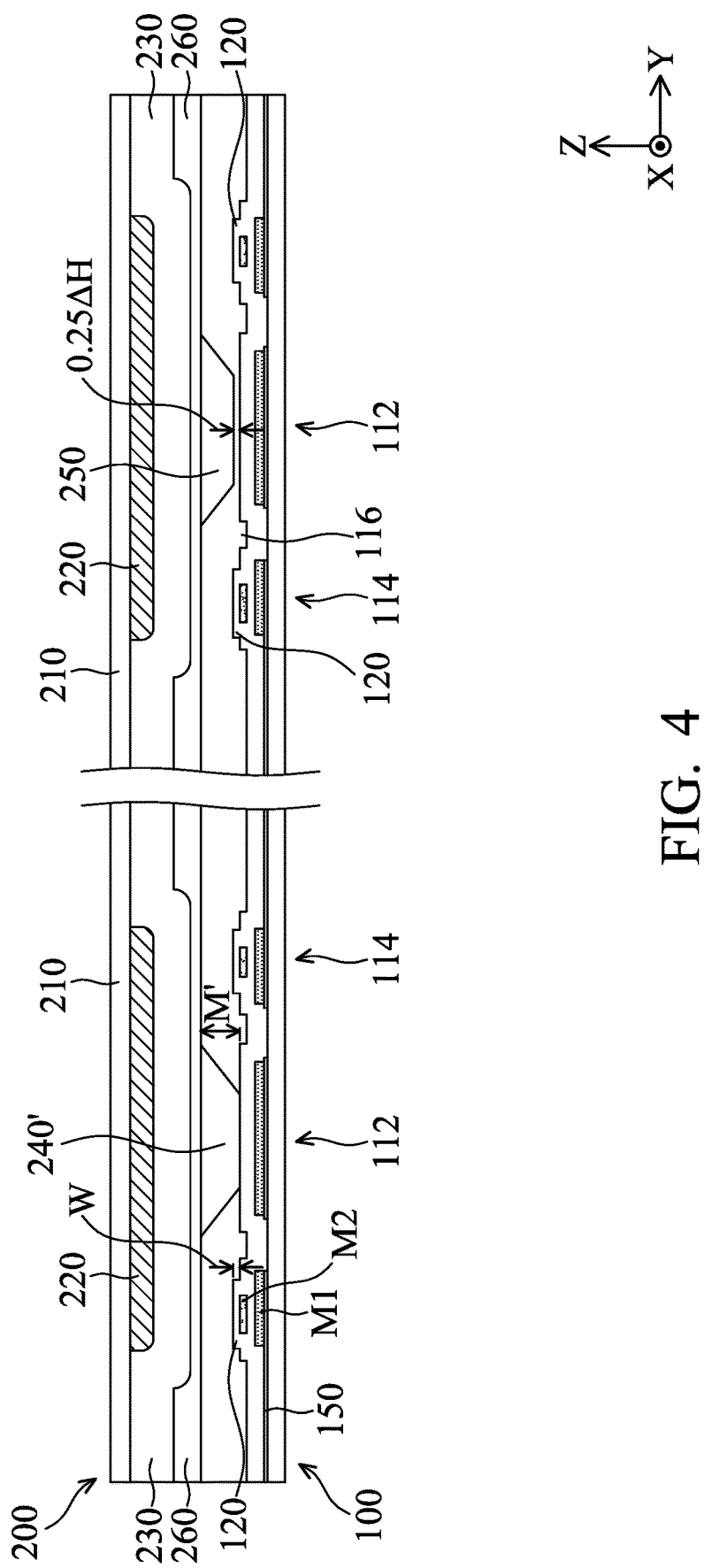
FIG. 4 is a cross-sectional view illustrating the display panel in accordance with some embodiments of the present disclosure.

FIG. 4 is a cross-sectional view illustrating the display panel 10 in accordance with some embodiments of the present disclosure. It is noted that FIG. 4 may be illustrated under standard atmospheric pressure or after the assembly of the first substrate structure 100 and the second substrate structure 200. As shown in FIG. 4, the main spacer 240' is compressed to have a thickness M' that is less than the thickness M. As such, the sub spacer 250 may be closer to the first substrate structure 100. In some embodiments, the sub spacer 250 may abut the first substrate structure 100. In some embodiments, under standard atmospheric pressure or after the assembly of the first substrate structure 100 and the second substrate structure 200, the thickness difference between the main spacer 240 and the sub spacer 250 may be a quarter of the thickness difference ΔH (0.25ΔH). The second height difference W may be greater than a quarter of the thickness difference ΔH. Accordingly, the sub spacer 250 may be limited by the protruding regions 114 (or the protrusion structures 120), and the display panel 10 may be further stable, reducing the possibility of misalignment of the first substrate structure 100 and the second substrate structure 200, reduce the possibility of the panel being scratched and reduce light leakage. In some embodiments, the thickness of main spacer may be different from the thickness of sub spacer. In some embodiments, the material of main spacer may be different from the material of sub spacer. In some embodiments, the number of main spacer may be different from the number of the sub spacer. For example, the number of main spacer may be less than the number of sub spacer. In some embodiments, the stiffness of main spacer may be different from the stiffness of sub spacer.

Figure 5A:
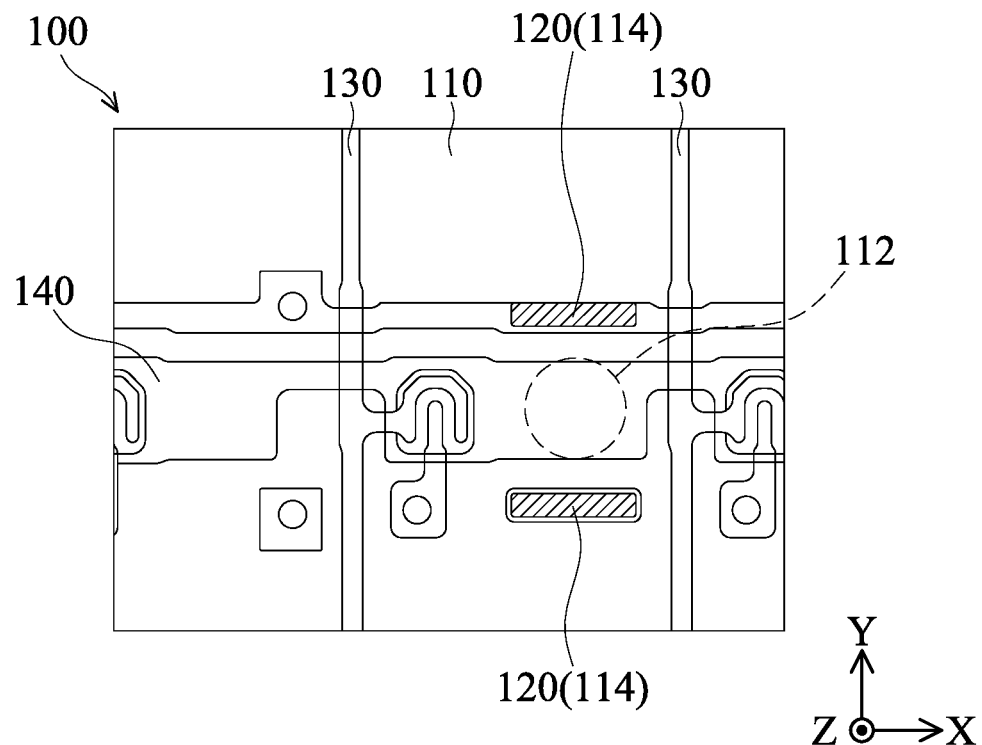
FIGS. 5A, 6A, and 7A are top views illustrating the first substrate structure in accordance with some embodiments of the present disclosure.

FIG. 5A is a top view illustrating the first substrate structure 100 in accordance with some embodiments of the present disclosure. It should be noted that the first substrate structure 100 in FIG. 5A may include the same or similar elements as the first substrate structure 100 shown in FIG. 1, these elements may be denoted as the same or similar numerals, and may not be discussed in detail below. Accordingly, the main spacer 240 or the sub spacer 250 may be well-positioned between the protrusion structures 120.

Figure 5B:
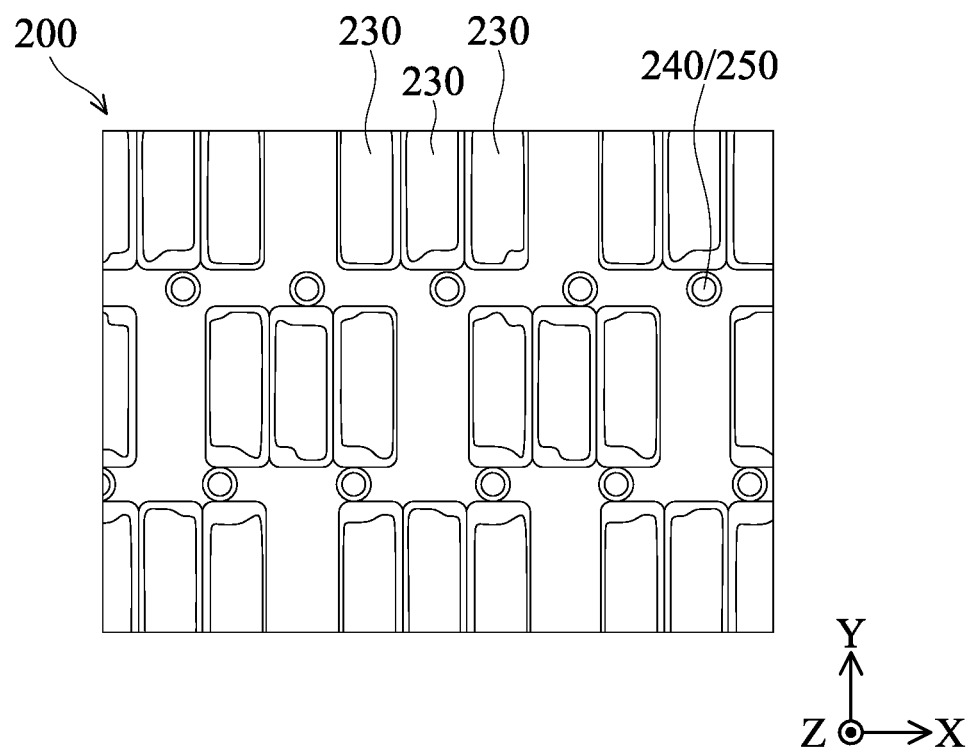
FIGS. 5B, 6B, and 7B are top views illustrating the second substrate structure in accordance with some embodiments of the present disclosure.

FIG. 5B is a top view illustrating the second substrate structure 200 in accordance with some embodiments of the present disclosure. As shown in FIG. 5B, a plurality of color filters may form a group of color filters, and the main spacer 240 may be located between different groups of color filters.

Figure 6A:
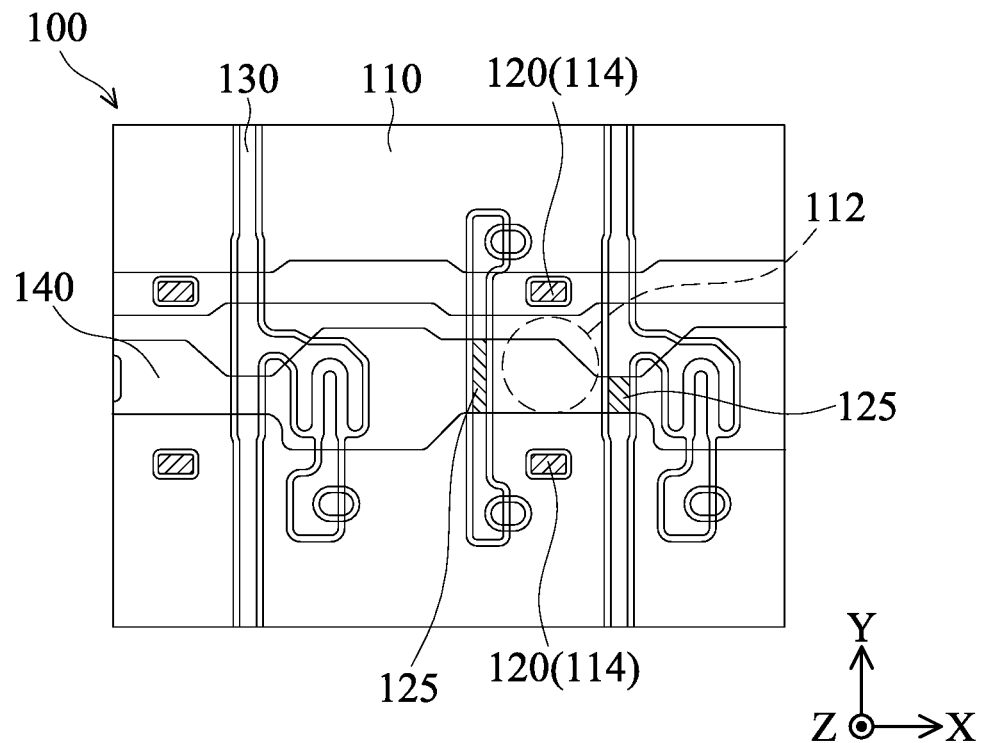

FIG. 6A is a top view illustrating the first substrate structure 100 in accordance with some embodiments of the present disclosure. It should be noted that the first substrate structure 100 in FIG. 6A may include the same or similar elements as the first substrate structure 100 shown in FIG. 1, these elements may be denoted as the same or similar numerals, and may not be discussed in detail below. As shown in FIG. 6A, the first substrate structure 100 may further include a plurality of protrusion structures 125. The protrusion structures 125 may be opposite to each other. Based on the above configuration, the main spacer 240 or the sub spacer 250 may be well aligned and positioned.

Figure 6B:
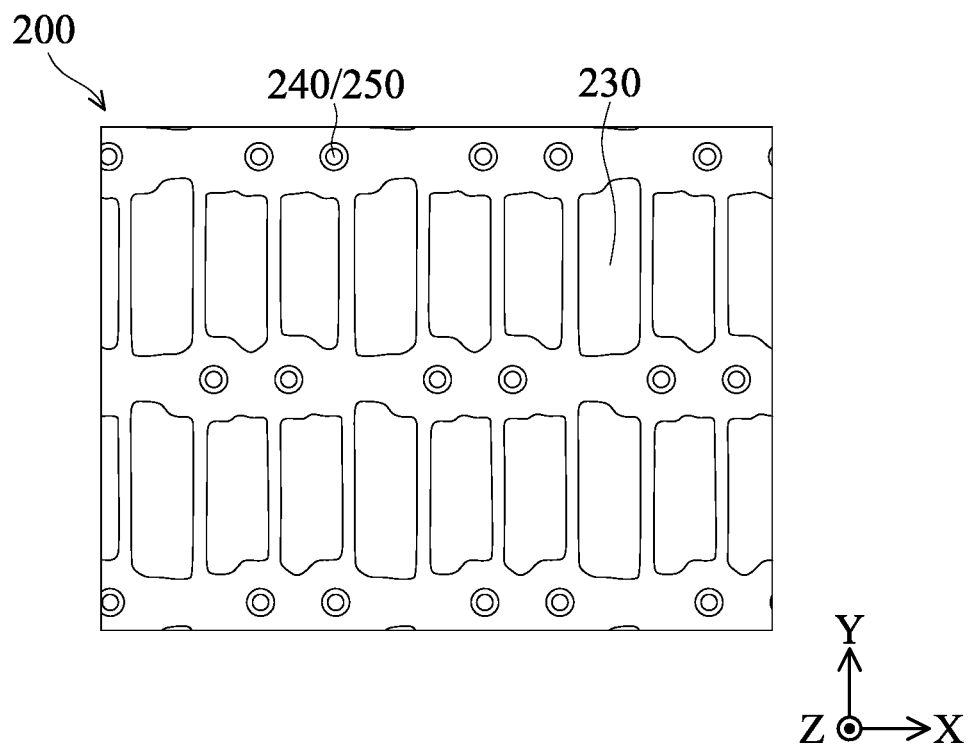

FIG. 6B is a top view illustrating the second substrate structure 200 in accordance with some embodiments of the present disclosure. As shown in FIG. 6B, the main spacer 240 or the sub spacer 250 may be disposed between color filters.

Figure 7A:
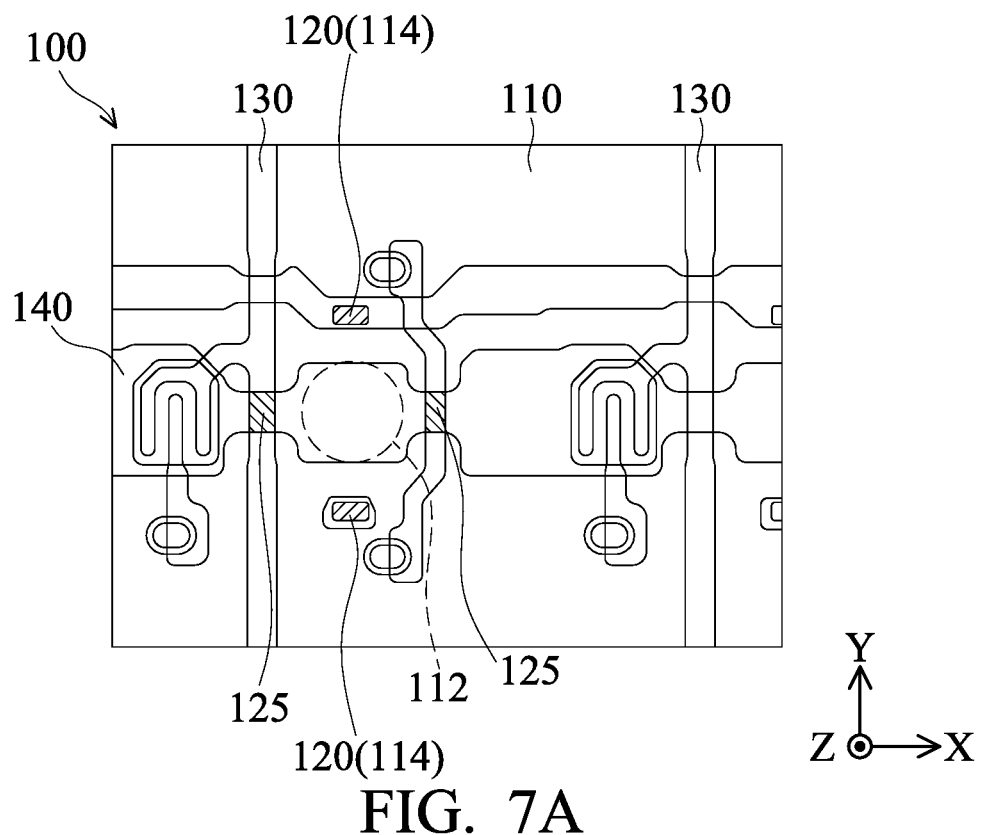

FIG. 7A is a top view illustrating the first substrate structure 100 in accordance with some embodiments of the present disclosure. It should be noted that the first substrate structure 100 in FIG. 7A may include the same or similar elements as the first substrate structure 100 shown in FIG. 6A, these elements may be denoted as the same or similar numerals, and may not be discussed in detail below. As shown in FIG. 7A, the two protrusion structures 125 that are opposite to each other are substantially aligned. That is, the corresponding edges of the two protrusion structures 125 may be located on the same horizontal plane. Based on the above configuration, the main spacer 240 or the sub spacer 250 may be well aligned and positioned.

Figure 7B:
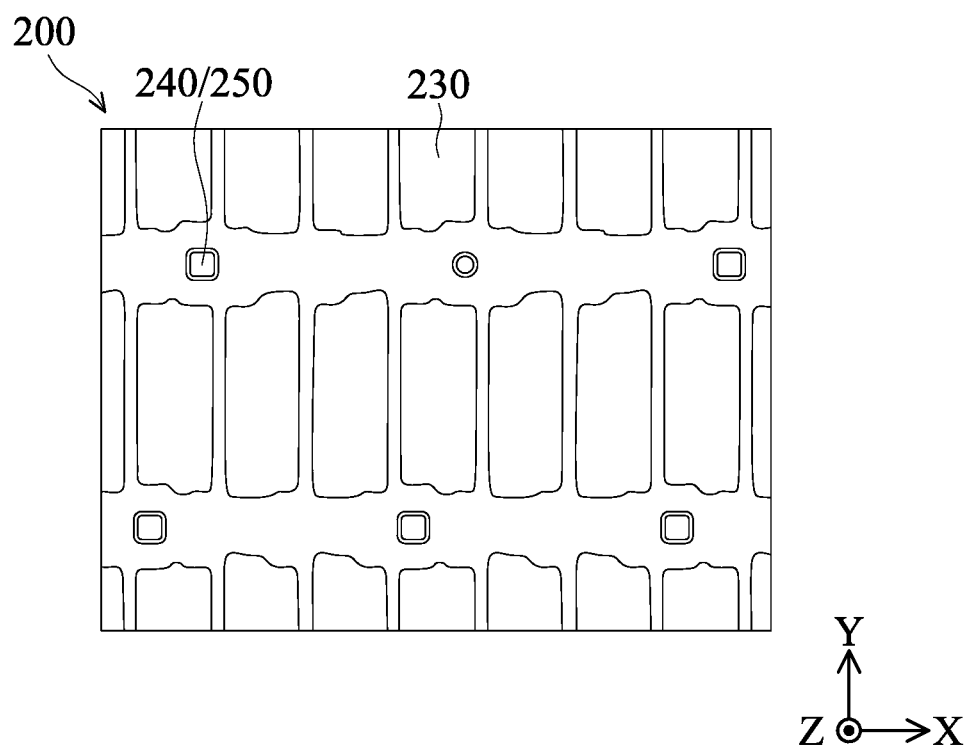

FIG. 7B is a top view illustrating the second substrate structure 200 in accordance with some embodiments of the present disclosure. As shown in FIG. 7B, the shape of the main spacer 240 or the sub spacer 250 may be rectangular in the top view, but the present disclosure is not limited thereto. In some embodiment, the shape of the main spacer 240 or the sub spacer 250 in the top view may be any suitable shape.

Multiple embodiments of the first substrate structure 100 and the second substrate structure 200 are described above. It should be noted that the above first substrate structures 100 and the second substrate structures 200 may be arbitrarily combined. The present disclosure is noted limited thereto.

Figure 8:
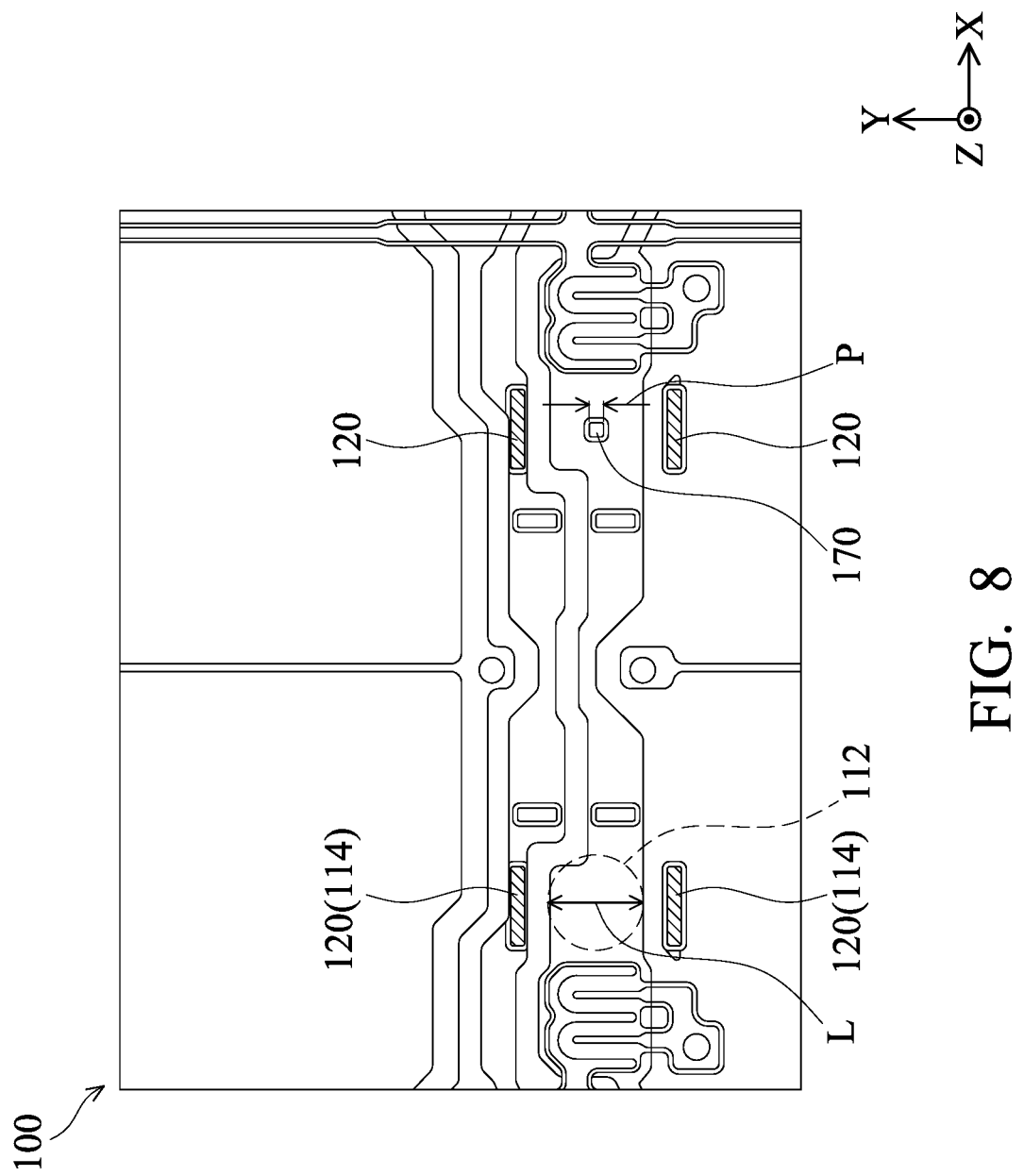
FIG. 8 is a cross-sectional view illustrating the first substrate structure in accordance with some embodiments of the present disclosure.

FIG. 8 is a cross-sectional view illustrating the first substrate structure 100 in accordance with some embodiments of the present disclosure. As shown in FIG. 8, the first substrate structure 100 may further include a bulging structure 170. The bulging structure 170 may correspond to and overlap the overlapping region 112 (for arranging the main spacer 240 therein). In some embodiments, the bulging structure 170 may have a length P, and the length may be less than half of the length L of the overlapping region 112. In some embodiments, the bulging structure 170 may have a length P, and the length may be less than half of the width T (shown in FIG. 2) of main spacer 240.

Figure 9:
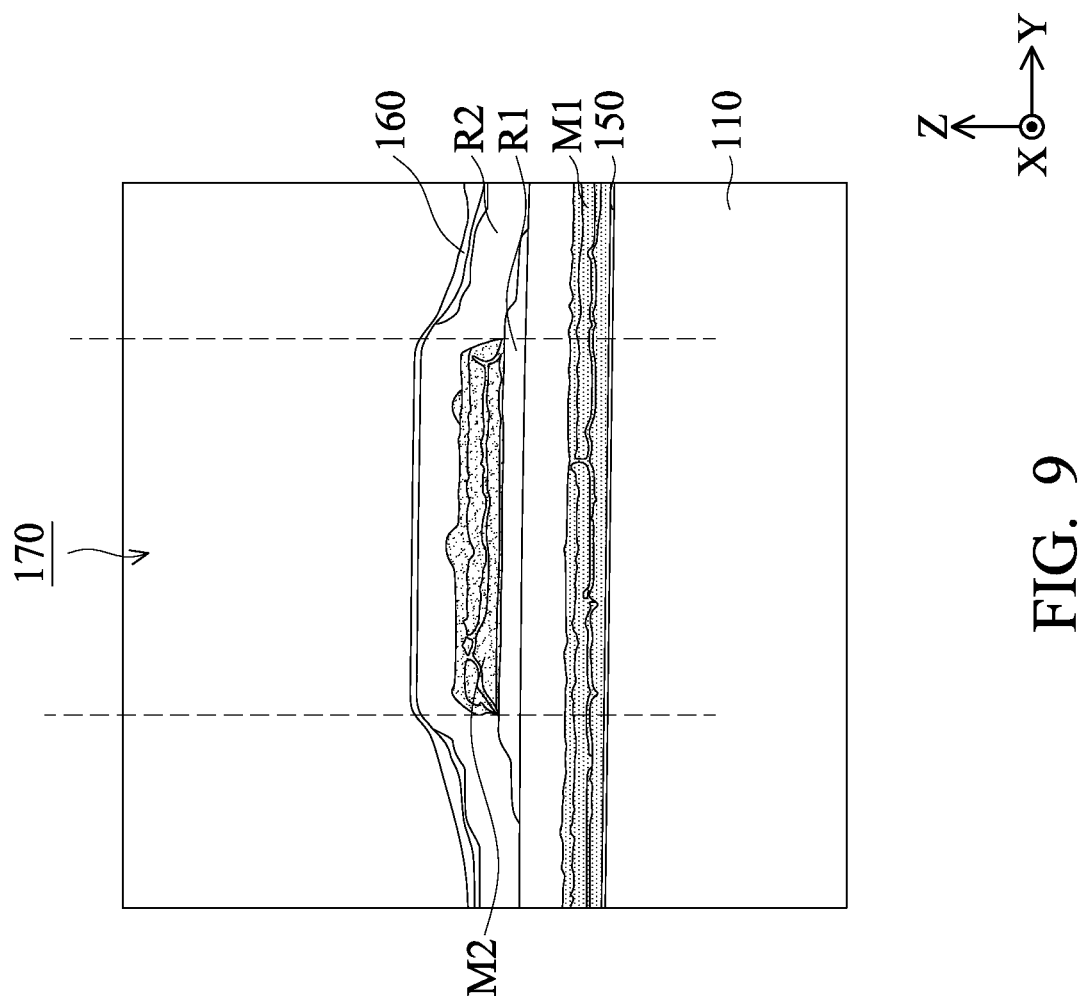
FIG. 9 is a cross-sectional view illustrating the bulging structure in accordance with some embodiments of the present disclosure.

FIG. 9 is a cross-sectional view illustrating the bulging structure 170 in accordance with some embodiments of the present disclosure. As shown in FIG. 9, the bulging structure 170 may be formed by stacking conductive elements M1, M2 and insulating elements R1, R2 in order. However, the present disclosure is not limited thereto. In some embodiments, a width of the bulging structure 170 may be defined between the edges of the conductive element M1, and the width of the bulging structure 170 may be measured in the Y direction, which is substantially parallel to the upper surface of the bulging structure 170, for example.

Figure 10:
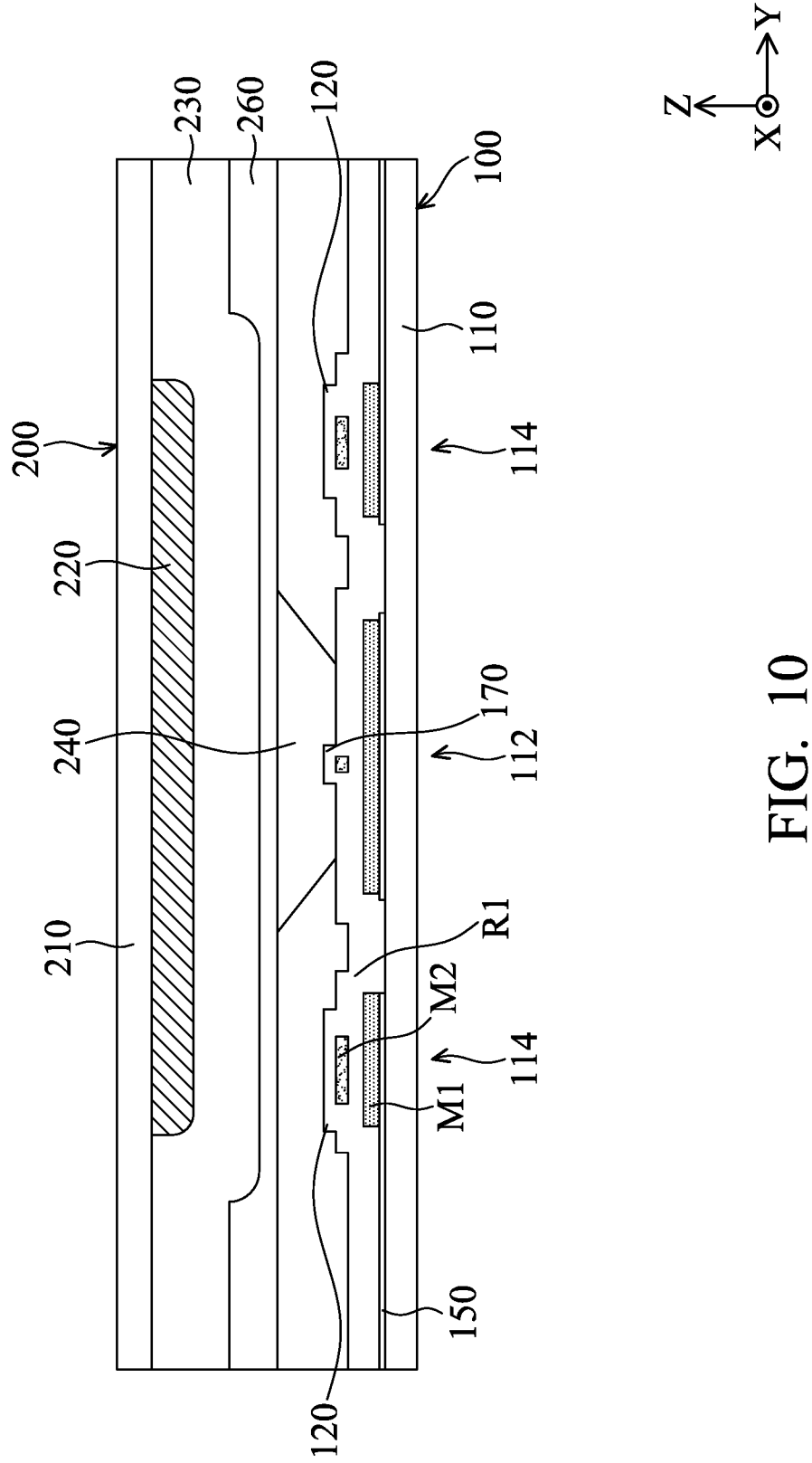
FIG. 10 is a cross-sectional view illustrating the display panel in accordance with some embodiments of the present disclosure.

FIG. 10 is a cross-sectional view illustrating the display panel 10 in accordance with some embodiments of the present disclosure. As shown in FIG. 10, the main spacer 240 may overlap the bulging structure 170. In some embodiment, the main spacer 240 may have certain flexibility, and the hardness of the bulging structure 170 may be greater than the hardness of the main spacer 240. Accordingly, bulging structure 170 may extend into the main spacer 240. In other words, the main spacer 240 covers the exposed surface of the bulging structure 170. Based on the above configuration, the possibility that the main spacer 240 shifts away from the correct position may be reduced.

As set forth above, the embodiments of the present disclosure may provide a display panel and a display device including a substrate with different heights for positioning the spacers. Accordingly, the spacers may be positioned between the two protruding regions of the substrate, and the possibility that the spacers shift may be reduced. In addition, a thickness difference may be formed between the main spacer and the sub spacer so as to improve the distribution of the liquid-crystal layer after the assembly of the display panel. As such, the yield and/or the performance of the display panel may be improved. The defect (such as a mura or a bubble in the liquid-crystal layer) may also be reduced.

While the embodiments and the advantages of the present disclosure have been described above, it should be understood that those skilled in the art may make various changes, substitutions, and alterations to the present disclosure without departing from the spirit and scope of the present disclosure. It should be noted that different embodiments may be arbitrarily combined as other embodiments as long as the combination conforms to the spirit of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An electronic device, comprising:
   a first substrate structure having a first overlapping region, first two protruding regions, a second overlapping region, second two protruding regions, and two protrusion structures, wherein one of the first overlapping region and the second overlapping region is located between the two protrusion structures; and
   a second substrate structure disposed opposite to the first substrate structure and comprising a main spacer and a sub spacer, wherein the main spacer overlaps the first overlapping region of the first substrate structure, and the sub spacer overlaps the second overlapping region of the first substrate structure,
   wherein the first overlapping region is located between the first two protruding regions, and the second overlapping region is located between the second two protruding regions,
   wherein the first substrate structure further comprises a base, a scan line and two adjacent data lines,
   wherein the scan line and the two adjacent data lines are disposed on the base, and the scan line between the two adjacent data lines has two wider portions and a narrower portion disposed between the two wider portions.

2. The electronic device as claimed in claim 1, wherein the first substrate structure has a first conductive element, an insulating element, and a second conductive element at a position corresponding to one of the first two protruding regions, wherein the first conductive element and the second conductive element are separated by the insulating element.

3. The electronic device as claimed in claim 1, wherein the first two protruding regions are arranged along an extending direction of the data line.

4. The electronic device as claimed in claim 1, wherein the two protrusion structures are arranged along an extending direction of the scan line.

5. The electronic device as claimed in claim 1, wherein the second substrate structure comprises a plurality of groups of color filters, and the main spacer is located between different groups of color filters.

6. The electronic device as claimed in claim 1, wherein a width of the scan line at a position where the scan line overlaps one of the data lines is less than a width of the scan line at another position where the scan line does not overlap the one of the data lines.

* * * * *